United States Patent
Aizawa et al.

(10) Patent No.: US 7,053,566 B2
(45) Date of Patent: May 30, 2006

(54) DRIVE TRAIN FOR HYBRID ELECTRIC VEHICLE

(75) Inventors: Takeo Aizawa, Atsugi (JP); Taiichi Onoyama, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/963,789

(22) Filed: Oct. 14, 2004

(65) Prior Publication Data

US 2005/0082992 A1    Apr. 21, 2005

(30) Foreign Application Priority Data

Oct. 15, 2003    (JP)    ............................. 2003-355010

(51) Int. Cl.
*H02P 1/54* (2006.01)

(52) U.S. Cl. .................... 318/34; 318/66; 318/140; 318/151; 318/152

(58) Field of Classification Search .................... 475/5; 290/40; 180/65.4; 60/59.7; 123/192.2; 310/83; 318/66, 34, 140, 151, 152, 153
See application file for complete search history.

(56) References Cited

U.S. PATENT DOCUMENTS

| | | | |
|---|---|---|---|
| 5,120,282 A | | 6/1992 | Fjallstrom |
| 5,841,201 A | * | 11/1998 | Tabata et al. ............. 290/40 C |
| 5,881,559 A | * | 3/1999 | Kawamura ................... 60/597 |
| 6,371,878 B1 | | 4/2002 | Bowen |
| 2002/0023790 A1 | | 2/2002 | Hata et al. |
| 2003/0069104 A1 | | 4/2003 | Nakano et al. |

FOREIGN PATENT DOCUMENTS

| | | |
|---|---|---|
| EP | 0 775 607 A1 | 5/1997 |
| JP | 2003-32808 A | 1/2003 |

* cited by examiner

*Primary Examiner*—Karen Masih
(74) *Attorney, Agent, or Firm*—Foley & Lardner LLP

(57) ABSTRACT

A drive train for a hybrid electric vehicle has an engine, first and second motor/generators, a third motor, and a transmission in connecting relationships with the engine, the motor/generators, and the third motor. The transmission has planetary gear sets to be shifted among a plurality of running modes including a large driving force running mode. A controller controls surplus power caused by power balance between the first and second motor/generators to be supplied to the third motor when the surplus power is generated and the vehicle starts with the transmission being operated in the large driving force running mode.

15 Claims, 8 Drawing Sheets

FIG. 2

|  | Low | Low-iVT | 2nd | High-iVT | High |
|---|---|---|---|---|---|
| Low-Brake | on | on | on | off | off |
| High-Clutch | off | off | on | on | on |
| High-Low-Brake | on | off | off | off | on |

FIG. 3

| | | binary(0:off, 1:on) | | | | | |
|---|---|---|---|---|---|---|---|
| | | E | EC | M | LB | HC | HLB |
| EV | Low | 0 | 0 | 1 | 1 | 0 | 1 |
| | Low-iVT | 0 | 0 | 1 | 1 | 0 | 0 |
| | 2nd | 0 | 0 | 1 | 1 | 1 | 0 |
| | High-iVT | 0 | 0 | 1 | 0 | 1 | 0 |
| | High | 0 | 0 | 1 | 0 | 1 | 1 |
| HEV | Low | 1 | 1 | 1 | 1 | 0 | 1 |
| | Low-iVT | 1 | 1 | 1 | 1 | 0 | 0 |
| | 2nd | 1 | 1 | 1 | 1 | 1 | 0 |
| | High-iVT | 1 | 1 | 1 | 0 | 1 | 0 |
| | High | 1 | 1 | 1 | 0 | 1 | 1 |

EV-Low mode

EV-Low -iVT mode

EV-2nd mode

EV-High-iVT mode

EV-High mode (HEV-)Low mode (HEV-)Low-iVT mode (HEV-)2nd mode (HEV-)High-iVT mode (HEV-)High mode

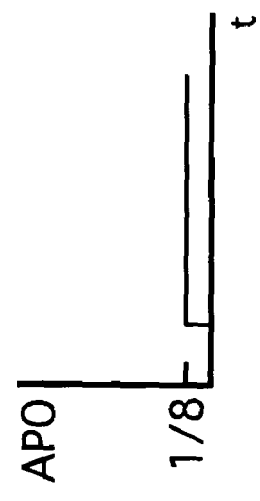
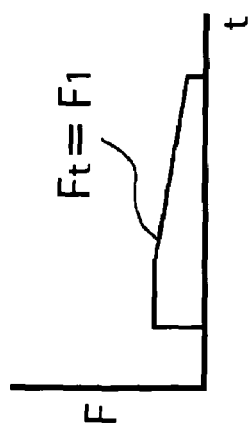
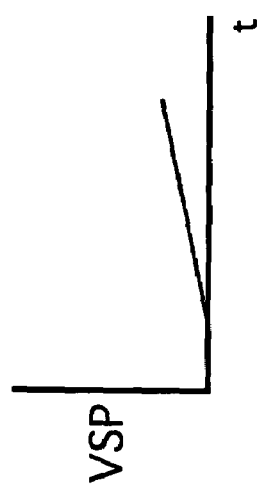
FIG. 7A  FIG. 7B  FIG. 7C
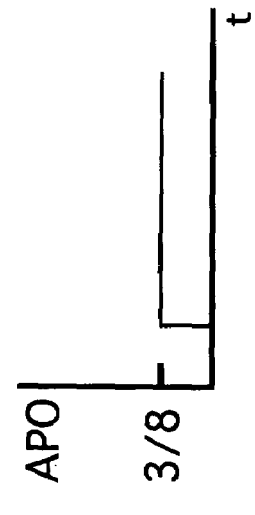
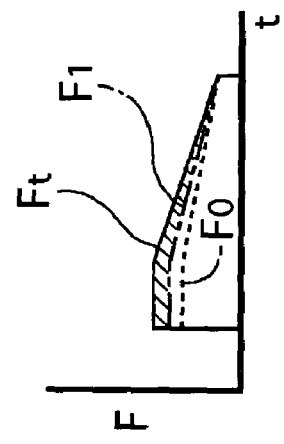
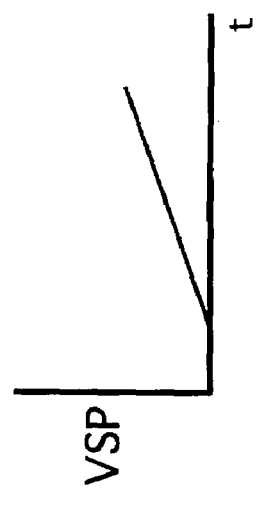
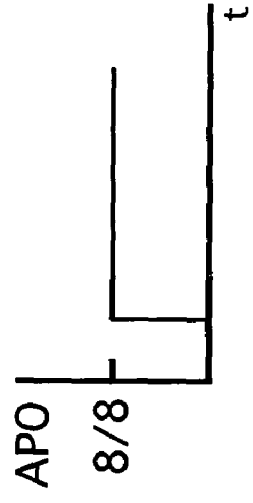
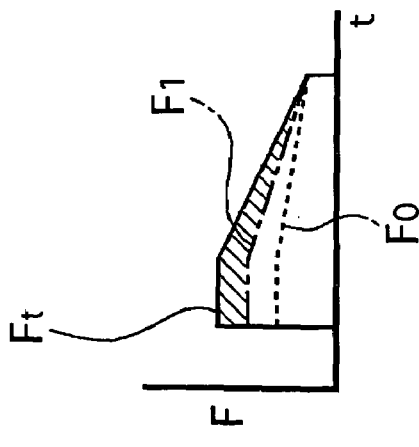
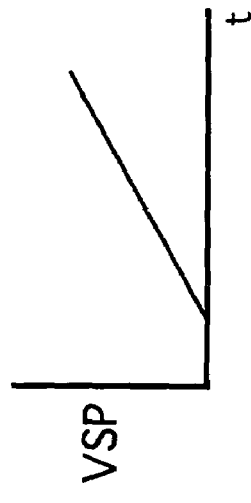
AP = 8/8    AP = 3/8    AP = 1/8

DRIVE TRAIN FOR HYBRID ELECTRIC VEHICLE

BACKGROUND OF THE INVENTION

1. Field of the Invention

The present invention relates to a drive train for a hybrid electric vehicle which combines a fuel combustion engine and a electric motor/generator as power sources to propel a motor vehicle in highly efficient driving performance.

2. Description of the Related Art

A drive train for a hybrid electric vehicle of this kind is disclosed in Japanese patent laying-open publication No. 2003-32808. This drive train has an engine, a first motor/generator, a second motor/generator, a differential device consisting of planetary gear sets connected with the engine, the first and second motor/generators, and a final drive. When vehicle starting, the drive train is shifted to a large driving force running mode, because large driving force is necessary for starting a motor vehicle. This running mode is set so that an amount of electricity generated by the first motor/generator at a low vehicle speed, for example 0 Km/h to about 30 Km/h, is larger than an amount of electricity supplied to the second motor/generator, because the first and second motor/generators are operated so as to absorb power corresponding to output power outputted from the engine when the large driving force for starting the vehicle is needed.

The above known conventional drive train, however, encounters a problem that when a battery is full-charged, surplus power generated by the first motor/generator is wasted into heat energy, resulting in degradation of fuel efficiency. Furthermore, this heat loss requires measures for cooling the first motor/generator.

It is, therefore, an object of the present invention to provide a drive train for a hybrid electric vehicle which overcomes the foregoing drawbacks and can efficiently use surplus power caused by a power balance between a first motor/generator and a second motor/generator for increasing driving force.

SUMMARY OF THE INVENTION

According to a first aspect of the present invention there is provided a drive train for a hybrid electric vehicle comprising: an engine that provides propulsion power by burning fuel; a first motor/generator that is selectively switched between an electric motor for providing a driving force and an electric generator for producing electric power; a second motor/generator that is selectively switched between an electric motor to provide a driving force and an and electric generator to produce electric power; a third motor capable of providing a driving force; a transmission equipped with planetary gear sets having rotatable elements that are in connecting relationships with an output shaft connected to wheels, the engine, and the first and second motor/generators, the transmission being capable of transferring at least an output of the engine to the wheels through the output shaft in a larae driving force running mode obtained under a condition where the engine is in operation and at least one of said first and second motor/generators acts as the electric generator; and a controller that controls the first and second motor/generators and the third motor so that surplus power caused by power balance between the first and second motor/generators in the large driving force running mode is supplied to the third motor when the surplus power is generated.

According to a second aspect of the present invention there is provided a transmission for a hybrid electronic vehicle comprising: planetary gear sets with rotatable elements that are in connecting relationships with an output shaft, an engine, a first motor/generator and a second motor/generator, wherein the planetary gear sets can be shifted among a plurality of running modes including a large driving force running mode, and have velocity axes corresponding to said first motor/generator, the engine, the output shaft, and the second motor/generator that are arranged in these order in a common velocity diagram of the transmission, the planetary gear sets being controlled by a low brake to obtain a transmission ratio in a low transmission ratio range including a hybrid-electronic-vehicle-variable-transmission-ratio (HEV-iVT) mode where the engine and the first and second motor/generators are in operation so as to obtain the variable transmission ratio and the planetary gear sets transfer at least an output of the engine to wheels through the output shaft with generating surplus power caused by a power balance between the first and second motor/generators for driving a third motor in vehicle starting in the HEV-iVT mode.

According to a third aspect of the present invention there is provided a method of driving a hybrid electric vehicle comprising: providing propulsion power by an engine; respectively switching a first motor/generator and a second motor/generator selectively between an electric motor for providing a driving force and an electric generator for producing electric power; and supplying surplus power caused by a power balance between the first and second motor/generators to a third motor for outputting a driving force when the surplus power is generated and a large driving force running mode of a transmission is obtained under a condition where the engine is in operation and at least one of the first and second motor/generators acts as an electric generator, the transmission being equipped with planetary gear sets, with rotatable elements that are in connecting relationships with an output shaft connected to wheels, the engine, and the first and second motor/generators to be shiftable among a plurality of running modes including the large driving force running mode where the transmission is capable of transferring at least an output of the engine to the wheels through the output shaft.

BRIEF DESCRIPTION OF THE DRAWINGS

The objects, features and advantages of the present invention will become apparent as the description proceeds when taken in conjunction with the accompanying drawings, in which:

FIG. 2 is a table showing engagement-and-disengagement states of three engaging elements of a driving force synthesizing transmission used in the mechanical and electric drive part in five running modes established thereby;

FIG. 3 is a table showing engagement-and-disengagement states of the three engaging elements in 10 running modes consisting of five electric vehicle (EV) running modes and five hybrid electric vehicle (HEV) running modes of the drive train;

FIG. 7A is a time chart showing characteristics of accelerator opening degree AP, driving force F, and vehicle speed VSP when starting vehicle at AP=8/8;

FIG. 7B is a time chart a time chart showing characteristics of the accelerator opening degree AP, the driving force F, and the vehicle speed VSP when starting vehicle at AP=3/8;

FIG. 7C is a time chart a time chart showing characteristics of the accelerator opening degree AP, the driving force F, and the vehicle speed VSP when starting vehicle at AP=1/8;

DETAILED DESCRIPTION OF THE PREFERRED EMBODIMENTS

Figure 1:
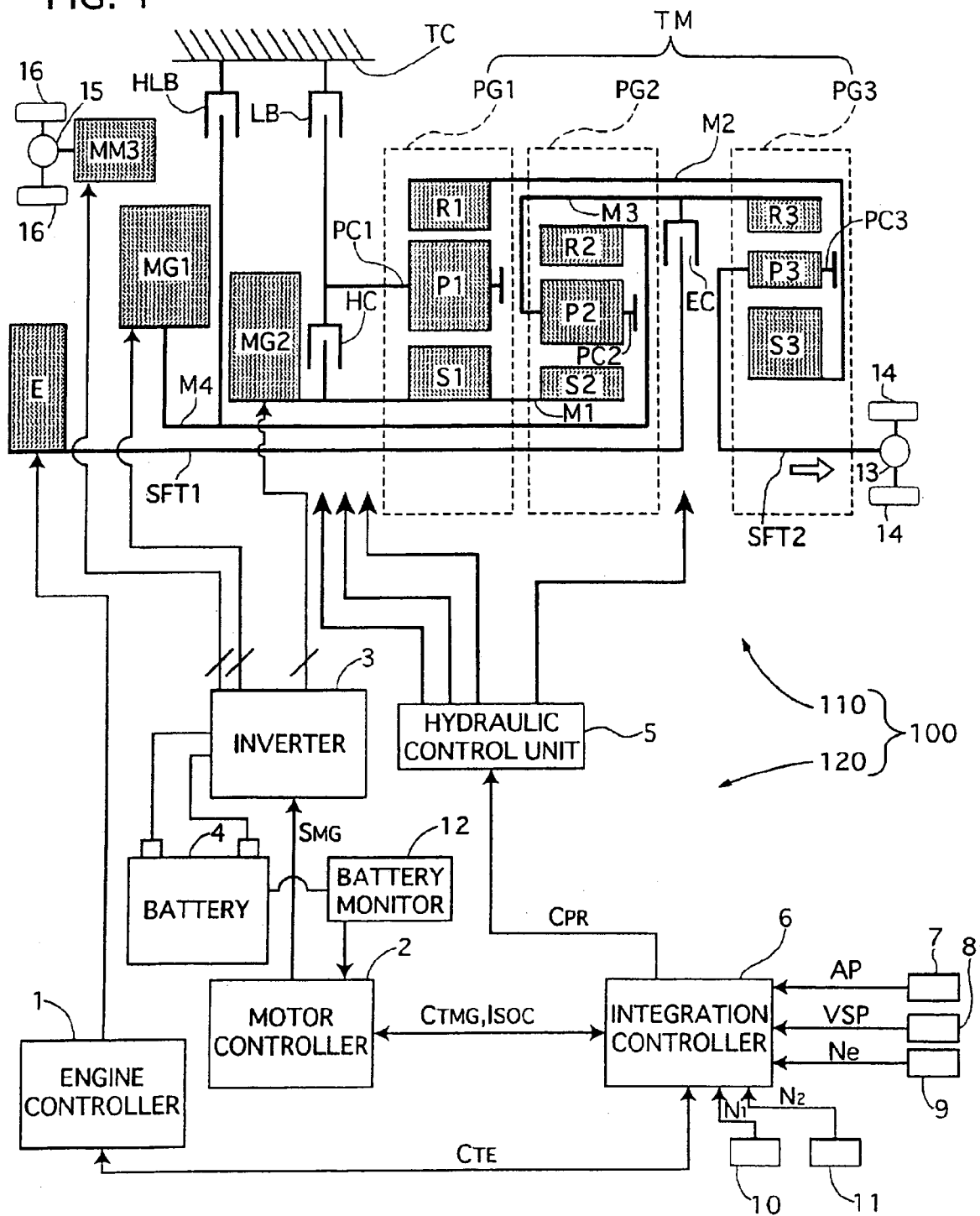
FIG. 1 is a schematic diagram showing a drive train for a hybrid electric vehicle of a first preferred embodiment according to the present invention, which includes a mechanical and electric drive part and a control part.

Throughout the following detailed description, similar reference characters and numbers refer to similar elements in all figures of the drawings, and their descriptions are omitted for eliminating duplication.

Referring to FIG. 1 of the drawing, there is shown a first preferred embodiment of a drive train for a hybrid electric vehicle according to the present invention.

The drive train 100 has a mechanical and electric drive part 110 that selectively provides mechanical and electric power or electrical power so as to apply driving force to wheels of a motor vehicle, and a hydraulic and electronic control part 120 that hydraulically and electronically controls the mechanical and electric part 110 according to driving conditions.

The mechanical and electric part 110 includes an engine E that provides propulsion power by burning fuel, a first and second electric motor/generators MG1 and MG2 that each selectively act as a motor so as to provide driving power or as a generator so as to generate electric power, a third electric motor MM3 that provides driving power so as to propel the vehicle, and a driving force synthesizing transmission TM that synthesizes driving forces from the engine E and the motor/generators MG1 and MG2 and outputs the synthesized driving force to the front wheels 14 through a front final drive 13. The drive train, therefore, has four power sources consisting of the engine E, the first and second motor/generators MG1 and MG2, and the third motor MM3. The driving force synthesizing transmission TM corresponds to a transmission of the present invention.

The control part 120 has a hydraulic control unit 5 that contains control valves and electromagnetic solenoids therein, which are not shown, so as to control hydraulic fluid flow to and/or from friction elements of the transmission TM. The friction elements consists of an engine clutch EC, a high clutch HC, a high and low brake HLB, and a low brake LB, which bring the transmission TM a plurality of transmission ratios by engagement and/or disengagement thereof so as to shift running modes of the drive train. The clutch HC and the brakes LB and HLB are multi-plate type friction elements that are hydraulically operated.

The control part 120 further has an engine controller 1 that controls the operation of the engine E, a motor controller 2 that controls an inverter 3 that supplies electric currents to the first and second motor/generators MG1 and MG2 and the third motor MM3 and charges a battery 4 with electric current generated by the first motor/generator MG1 and/or the second motor/generator MG2, and an integration controller 6 that synthetically controls the engine controller 1, the motor controller 2, and the electromagnetic solenoids in the hydraulic control unit 5. The integration controller 6 acts as a controller of the present invention.

First, the construction of the mechanical and electric part 110 will be described in detail.

The engine E employs a fuel combustion engine, which includes an internal combustion engine, such as a gasoline engine, a diesel engine or an alcohol engine, and an external combustion engine, such as a gas turbine.

The first and second motor/generators MG1 and MG2 act as either a motor or a generator, switching between functions according to the driving conditions. The third motor MM3 is connected with the rear wheels 16 through a rear final drive 15. The front and rear wheels correspond to the first and second sets of wheels of the present invention, respectively.

The driving force synthesizing transmission TM is equipped with a first planetary gear set PG1, a second planetary gear set PG2, and a third planetary gear set PG3, all of which are of a single pinion type.

The first planetary gear set PG1 has a first sun gear S1, a first ring gear R1, a plurality of first pinions P1 meshed with the first sun gear S1 and the first ring gear R1, and a first pinion carrier PC1 rotatably supporting the first pinions PC1.

The second planetary gear set PG2 has a second sun gear S2, a second ring gear R2, a plurality of second pinions P2 meshed with the second sun gear S2 and the second ring gear R2, and a second pinion carrier PC2 rotatably supporting the second pinions PC2.

The third planetary gear set PG3 has a third sun gear S3, a third ring gear R3, a plurality of third pinions P3 meshed with the third sun gear S3 and the third ring gear R3, and a third pinion carrier PC3 rotatably supporting the third pinions PC3.

The first and second sun gears S1 and S2 are connected with the second motor/generator MG2 through a first rotatable member M1. The first rotatable member M1 can be connected with the first carrier PC1 by engaging the high clutch HC and fixed to the transmission case TC by engaging the high clutch HC and the low brake LB. The first ring gear R1 is connected with the third sun gear S3 through a second rotatable member M2. The first pinion carrier PC1 can be connected with the first rotatable member M1 by engaging the high clutch HC and fixed to a transmission case TC by applying the low brake LB.

The second ring gear R2 is connected with the first motor/generator MG1 through a fourth rotatable member M4 which can be fixed to the transmission case TC by applying the high and low brake HLB. The second carrier PC2 is connected with the third ring gear R3 through a third rotatable member M3 that can be connected with an output shaft SFT1 of the engine E by engaging the engine clutch EC.

The third carrier PC3 is connected with an output shaft SFT2 of the transmission TM. The output shaft SFT2 of the transmission TM is arranged in coaxial with the output shaft SFT1 of the engine E, which enables the transmission TM to be applied to both of front engine/front wheel drive vehicles and front engine/rear wheel drive vehicles.

Next, the construction of the hydraulic and electronic control part 120 will be described in detail.

The hydraulic control part 120 includes the hydraulic control unit 5 that receives a shift command $C_{PR}$ from the integration controller 6 to energize or deenergize the electromagnetic solenoids, thereby controlling hydraulic fluid flow to and/or from the clutches EC and HC and the brakes LB and HLB.

The engine controller 1 is electrically connected to the integration controller 6 so as to receive a target engine torque request $C_{TE}$ from the integration controller 6 and output an operating command to a not-shown throttle valve actuator of the engine E for example. Accordingly, the actuator is controlled according to the operating command so that the engine E runs at an operation point, identified by engine speed and engine torque of the engine E, where target engine torque can be obtained.

The motor controller 2 is electrically connected to the inverter 3 and the integration controller 6 to receive target motor/generator torque request $C_{TMG}$ from the integration controller 6 and output a current control command to the inverter 3 for independently controlling operation points of the first and second motor/generators MG1 and MG2. The motor controller 2 is also electrically connected to a battery monitor 12 to receive information $I_{SOC}$ on State of Charge (S.O.C.) of the battery 4 and output the information $I_{SOC}$ to the integration controller 6. The integration controller 6 controls the motor controller 2 based on the information $I_{SOC}$ so as to keep the battery 4 in a desirable charge range.

The inverter 3 is electrically connected to stator coils, not shown, of the first and second motor/generators MG1 and MG2 and the third motor MM3, and produces to supply driving currents respectively to the motor/generators MG1 and MG2 and the third motor MM3 according to the current control command outputted from the motor controller 2. The inverter 3 is also electrically connected to the battery 4 and controls the battery 4 to discharge electricity to at least one of the motor/generators MG1 and MG2 and the third motor MM3 or to be charged by electricity generated by at least one of the motor/generators MG1 and MG2.

The integration controller 6 is electrically connected to an accelerator sensor 7, a vehicle speed sensor 8, an engine speed sensor 9, a first motor/generator speed sensor 10, a second motor/generator speed sensor 11, the engine controller 1, the motor controller 2, and the hydraulic control unit 5. The integration controller 6 receives information on accelerator opening degree AP outputted from the accelerator sensor 7, vehicle speed VSP outputted from the vehicle speed sensor 8, engine rotational speed Ne outputted from the engine speed sensor 9, first motor/generator rotational speed N1 outputted from the first motor/generator rotational speed sensor 10, the second motor/generator rotational speed N2 outputted from the second motor/generator rotational speed sensor 11, the information on the S.O.C outputted from the motor controller 2 so as to output requests for controlling the engine controller 1, motor controller 2, and the hydraulic control unit 5. The integration controller 6 outputs the target engine torque request $C_{TE}$ determined based on the accelerator opening degree AP and the engine rotational speed Ne to the engine controller 1, and outputs the target motor/generator torque request $C_{TMG}$ determined based on the first and second motor/generator rotational speeds N1 and N2 to the motor controller 2.

The battery monitor 12 is electrically connected to the battery 4 and the motor controller 2 and monitors the S.O.C. based on voltage, current, temperature and the like of the battery 4 to output information on the S.O.C. to the integration controller 6 through the motor controller 2.

The operation of the above-constructed drive train 100 will be described with reference to the accompanying drawings.

The drive train 100 can be shifted between two different modes: electric vehicle (EV) mode and hybrid electric mode (HEV) mode. The EV mode can be obtained by disengaging the engine clutch EC and driving at least one of the first and second motor/generators MG1 and MG2, and the third motor MM3 with the engine E being stopped, while HEV mode can be obtained by engaging the engine clutch EC and operating the first and second motor/generators MG1 and MG2, the third motor MM3, and the engine E.

In addition, as shown in a table of FIG. 2, the transmission TM can be shifted by controlling the high clutch HC and the brakes LB and HLB so as to obtain five different transmission ratios corresponding to five different running modes: LOW mode; LOW-iVT mode, 2nd mode, High-iVT mode, and High mode.

The LOW mode denotes a running mode in which the transmission TM is operated at a low gear ratio, the LOW-iVT mode denoting a running mode in which the transmission TM is operated at a variable ratio in a low transmission ratio area, the 2nd mode denoting a running mode in which the transmission TM is operated at a second gear ratio that is smaller than that of the low gear ratio, the High-iVT mode denoting a running mode in which the transmission TM is operated at a variable ratio in a high transmission ratio area that is smaller than that of the low transmission ratio area, and the High mode denoting a running mode in which the transmission TM is operated at a high gear ratio that is smaller than that of the second gear.

In order to obtain the LOW mode, the brakes LB and HLB are applied and the high clutch HC is disengaged. In order to obtain the LOW-iVT mode, the low brake LB is applied and the high clutch HC and the high and low brake HLB are disengaged. In order to obtain the 2nd mode, the low brake LB and the high clutch HC are engaged and the high and low brake HLB is disengaged. In order to obtain the High-iVT mode, the low brake LB and the high and low brake HLB are released and the high clutch HC is engaged. In order to obtain the High mode, the low brake LB is released and the high clutch HC and the high and low brake HLB are engaged.

These five running modes can be obtained with respect to each of the EV mode and HEV mode, which enables the drive train to be operated in 10 different running modes as shown in the table of FIG. 3. In the table of FIG. 3, "1" indicates that the corresponding power source is operated or the corresponding friction element is engaged, and "0" indicates that the corresponding power source is not operated or the corresponding friction element is disengaged. Note that the first and second motor/generators MG1 and MG2 and the third motor MM3 are referred as "M" in this table.

In order to obtain the five transmission ratios corresponding to the running modes, the transmission TM is set to have six rotatable elements: the first to fourth rotatable members M1 to M4, the first pinion carrier PC1, and the third pinion carrier PC3. These connecting relationships are changed according to combinations of engagement and/or disengagement of the clutch HC and the brakes LB and HLB. The rotational velocity relationships among these six rotatable elements M1 to M4, PC1, and PC3 can be schematically illustrated by using a common velocity diagram for easily understanding.

The common velocity diagram is often used to show relationships among velocities of three rotatable members of a planetary gear set consisting of a sun gear, a ring gear, and a pinion carrier. The diagram has a plurality of vertical axes that correspond to the sun gear, the ring gear, and the pinion carrier to indicate their rotational velocities and a horizontal axis that is positioned at a velocity of zero r.p.m. The vertical axes are arranged along the horizontal axis at positions according to a teeth ratio TR determined by (the teeth number of the sun gear)/(the teeth number of the ring gear) of the planetary gear set. Namely, the vertical axes are positioned so that when the interval between the axes of the pinion carrier and the sun gear is set to be 1, the interval between the axes of the ring gear and the pinion carrier is set to be the teeth ratio TR. If the rotatable element rotates in a driving direction, its velocity point on its vertical axis is in the upper zone over the horizontal axis, while if the rotatable element rotates in a driven direction, its velocity point on its vertical axis is in the lower zone under the horizontal axis. The velocity points, ordinates representing velocities on the respective vertical axes, are always positioned on a straight line, because meshing relationships between the sun gear and the pinions and between the pinions and the ring gear is linear.

In the transmission TM, the ratios of the first to third planetary gear sets PG1 to PG3 are respectively set to be $\alpha$, $\beta$, and $\delta$, values of which are smaller than 1, where $\alpha$ is a ratio of (the teeth number of the first sun gear S1)/(the teeth number of the first ring gear R1), $\beta$ is a ratio of (the teeth number of the second sun gear S2)/(the teeth number of the second ring gear R2), and $\delta$ is a ratio of (the teeth number of the third sun gear S3)/(the teeth number of the third ring gear R3).

FIGS. 4A to 4E show common velocity diagrams in EV modes, and FIGS. 5A to 5E show common velocity diagrams in HEV modes. In these diagrams, a straight line LP1 indicates the line of the first planetary gear set PG1, which intersects with the axes of the first rotatable member M1, the first pinion carrier PC1, and the second rotatable member M2 at their velocity points. The line LP1 is divided by the first pinion carrier PC1 into two parts whose lengths become 1:$\alpha$. A straight line LP2 indicates the line of the second planetary gear set PG2 which intersects with the axes of the first rotatable member M1, the third rotatable member M3, and the fourth rotatable member M4 at their velocity points. The line LP2 is divided by the third rotatable member M3 into two parts whose lengths become 1:$\beta$. A straight line LP3 indicates the line of the third planetary gear set PG3 which intersects with the axes of the second rotatable member M2, the third pinion carrier PC3, and the third rotatable member M3 at their velocity points. The line LP3 is divided by the third pinion carrier PC3 into two parts whose lengths become 1:$\delta$.

First, the operation of the drive train in the EV modes will be described with reference to the accompanying drawings of FIGS. 3 and 4A to 4E.

Figure 4A:
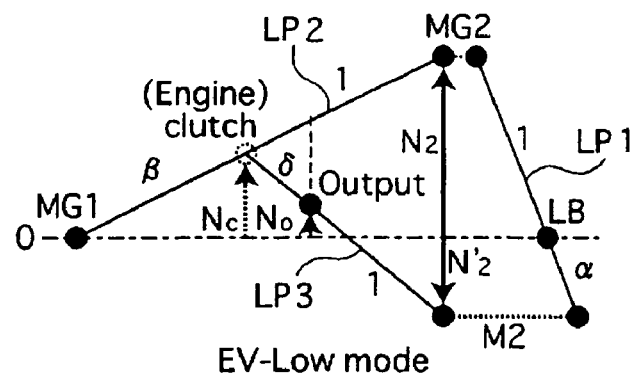
FIG. 4A is a common velocity diagram of the transmission in EV-LOW mode, where "LOW" denotes a low gear ratio of the transmission.

In the EV-LOW mode, as shown in FIGS. 3 and 4A, the low brake LB is applied so as to fix the first pinion carrier PC1 to the transmission case TC, which results in stopping rotation of the first pinion carrier PC1. In addition, the high and low brake HLB is applied so as to fix the fourth rotatable element M4 to the transmission case TC, which results in stopping the first motor/generator MG1 and the second ring gear R2. The high clutch HC is disengaged so that the first rotatable member M1 connected to the second motor/generator MG2 is free from the first pinion carrier PC1 stopped by the low brake LB and the transmission case TC. The second motor/generator MG2 is operated to drive the first rotatable member M1 at a rotational speed of $N_2$ in the driving direction, which rotates the second rotatable member M2 at a reduced speed of $N'_2$ in the driven direction and the third rotatanble member M3 at a reduced speed of Nc in the driving direction to rotate the third pinion carrier PC3 connected with the output shaft SFT2 at a reduced speed of No in the driving direction. Therefore, the drive train 100 propels the vehicle at the low gear ratio by power outputted from the second motor/generator MG2.

Figure 4B:
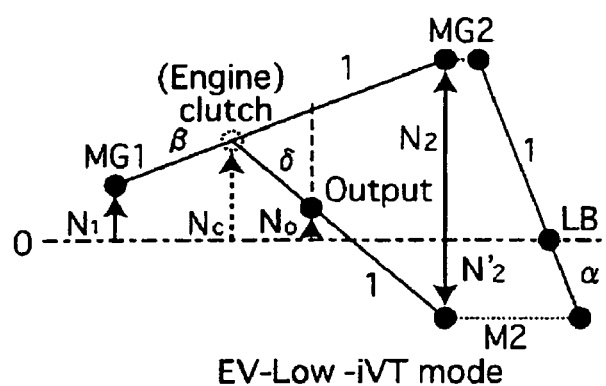
FIG. 4B is a common velocity diagram of the transmission in EV-LOW-iVT mode, where "LOW-iVT" denotes a variable ratio in a lower transmission ratio area of the transmission.

In the EV-LOW-iVT mode, as shown in FIGS. 3 and 4B, only the low brake LB is applied so as to fix the first pinion carrier PC1 to the transmission case TC, which results in stopping the rotation of the first pinion carrier PC1. The first motor/generator MG1 is operated to drive the fourth rotatable member M4 at a rotational speed of $N_1$ in the driving direction, and the second motor/generator MG2 is operated to drive the first rotable member M1 at the rotational speed of $N_2$ in the driving direction, which results in steplessly varying the rotational speed of No of the third pinion carrier PC3 in the low transmission ratio area by changing the output speed of $N_1$ of the first motor/generator MG1. Therefore, the drive train 100 propels the vehicle at variable ratios in the low transmission ratio area by powers outputted from the first and second motor/generators MG1 and MG2.

Figure 4C:
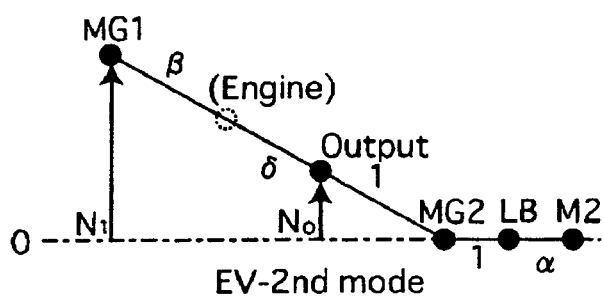
FIG. 4C is a common velocity diagram of the transmission in EV-2nd mode, where "2nd" tenotes a second gear ratio of the transmission which is smaller than the low gear ratio.

In the EV-2nd mode, as shown in FIGS. 3 and 4C, the low brake LB is applied so as to fix the first pinion carrier PC1 to the transmission case TC, which results in stopping the rotation of the first pinion carrier PC1. In addition, the high clutch HC is engaged to connect the first pinion carrier PC1 and the first rotatable member M1 with each other, which results in stopping rotation of the first rotatable member M1 and the second motor/generator MG2. The high and low brake HLB is released. The first motor/generator MG1 is operated to drive the fourth rotatable member M4 at the rotational speed of $N_1$ in the driving direction, thereby rotating the third rotatable member M3 and the third pinion carrier PC3 in the driving direction. The reduced speed of No of the third pinion carrier PC3 becomes faster than that in the EV-LOW mode. Therefore, the drive train 100 propels the vehicle by power of the first motor/generator MG1 at the second gear ratio by powers outputted from the first and second motor/generators MG1 and MG2.

Figure 4D:
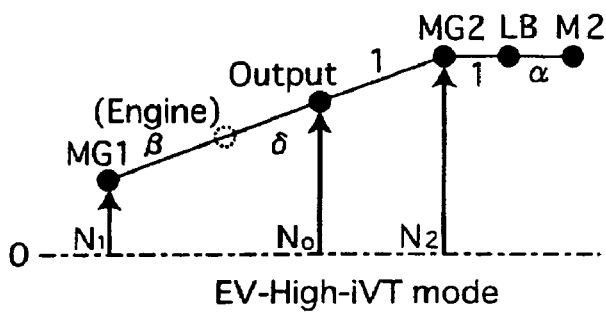
FIG. 4D is a common velocity diagram of the transmission in EV-High-iVT mode, where "High-iVT" denotes a variable ratio in a higher transmission ratio area of the transmission.

In the EV-High-iVT mode, as shown in FIGS. 3 and 4D, only the high clutch HC is engaged to connect the first pinion carrier PC1 and the first rotatable member M1 with each other, which results in rotating the first planetary gear set PG1 in one unit body. The first motor/generator MG1 is operated to drive the fourth rotatable member M4 at the rotational speed of $N_1$ in the driving direction, and the second motor/generator MG2 is operated to drive the first rotatable member M1 at the rotational speed of $N_2$ in the driving direction, which results in steplessly varying the rotational speed of No of the third pinion carrier PC3 in the high transmission ratio area by changing the output speed $N_1$ of the first motor/generator MG1. Therefore, the drive train 100 propels the vehicle at variable ratios in the high transmission ratio area by powers outputted from the first and second motor/generators MG1 and MG2.

Figure 4E:
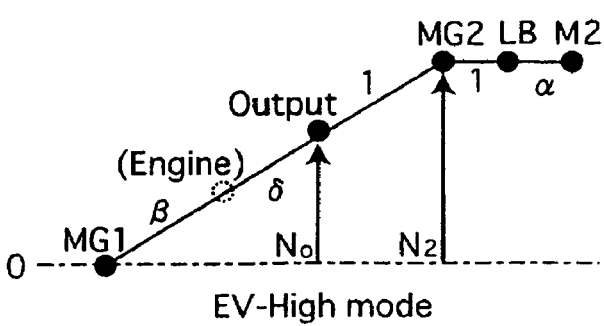
FIG. 4E is a common velocity diagram of the transmission in EV-High mode, where "High" denotes a high gear ratio of the transmission ratio which is smaller than the second gear ratio.
Figure 5A:
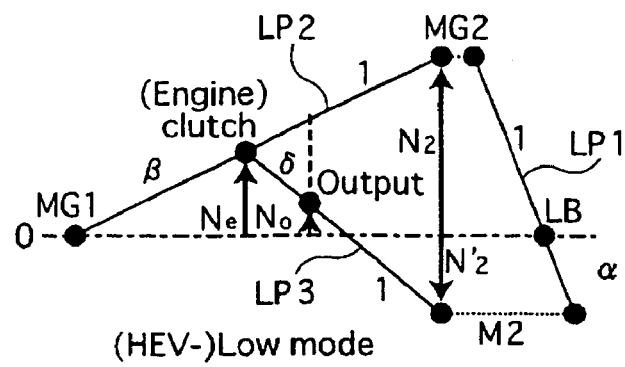
FIG. 5A is a common velocity diagram of the transmission in HEV-LOW mode.
Figure 5B:
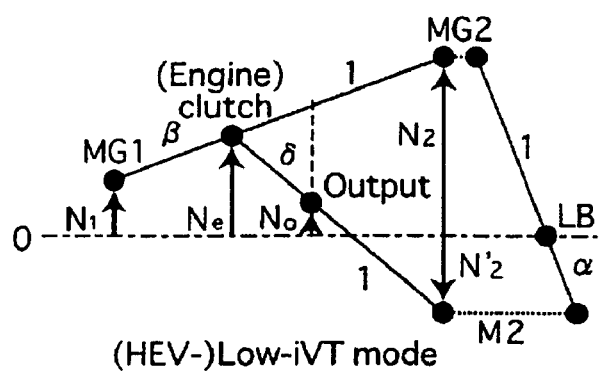
FIG. 5B is a common velocity diagram of the transmission in HEV-LOW-iVT mode.
Figure 5C:
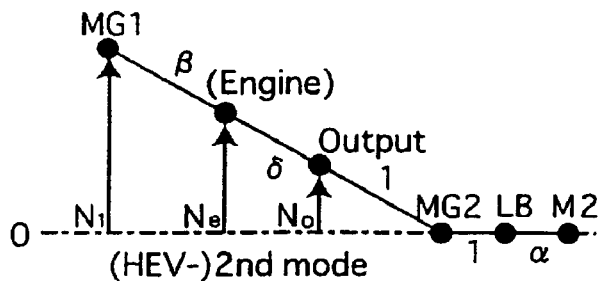
FIG. 5C is a common velocity diagram of the transmission in HEV-2nd mode.
Figure 5D:
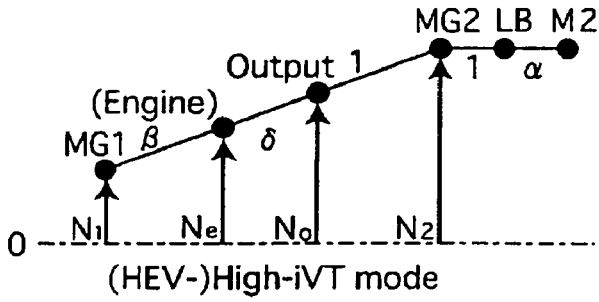
FIG. 5D is a common velocity diagram of the transmission in HEV-High-iVT mode.
Figure 5E:
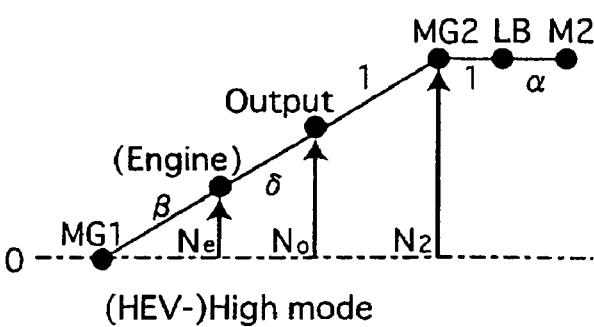
FIG. 5E is a common velocity diagram of the transmission in HEV-High mode.

In the EV-High mode, as shown in FIGS. 3 and 4E, the high clutch HC is engaged so as to connect the first pinion carrier PC1 and the first rotatable element M1 with each other, which results in rotating the first planetary gear set PG1 in one unit body. In addition, the high and low brake HLB is applied so as to fix the fourth rotatable member M4 to the transmission case TC, which results in stopping the rotation of the first motor/generator MG1 and the second ring gear R2. The low brake LB is released. The second motor/generator MG2 is operated to drive the first rotatable member M1 in the driving direction at the rotational speed of $N_2$ in the driving direction, thereby rotating the third rotatable member M3 and the third pinion carrier PC3 at the reduced speed of N0 in the driving direction. The speed of No of the third pinion carrier PC3 becomes larger than that in the EV-2nd mode. Therefore, the drive train 100 propels the vehicle at a high gear ratio by power outputted from the second motor/generator MG2.

Next, the operation of the drive train 100 in the HEV modes will be described with reference to the drawings of FIGS. 3 and 5A to 5E.

In the HEV modes, in addition to operations of the first motor/generator MG1 and/or the second motor/generator MG2 in the EV mode, the engine clutch EC is engaged and the engine E is operated to provide the third rotatable member M3 with driving force. Accordingly, the member M3 is rotated at a speed of Ne in the driving direction. FIGS. 5A to 5E show common velocity diagrams in HEV-LOW mode, HEV-LOW-iVT mode, HEV-2nd mode, HEV-High-iVT mode, and HEV-High mode, respectively. The diagrams are similar to FIGS. 4A to 4E except that the third rotatable member M3 is driven in the driving direction by the engine E, and their detailed descriptions are omitted herein.

HEV-iVT modes includes the HEV-LOW-iVT mode and the HEV-HIGH-iVT mode, which cover all transmission ratio used in the transmission TM, complementing the ratio with each other. Accordingly, the motor/generators MG1 and MG2 are sufficient to produce their output that is under about 20% of that of the engine E.

The integration controller 6 has running mode maps in which the ten running modes are allocated to three dimensional space defined by the accelerator opening degree AP, the vehicle speed VSP, and the S.O.C. of the battery 4. The integration controller 6 selects an optimum running map from the maps based on a detected S.O.C. and an operating point of the power sources determined from a detected accelerator opening degree AP and a detected vehicle speed VSP.

The shift from one running mode to another running mode is performed by predetermined sequence control of the friction elements HC, LB, and HLB so that operation points of the motor/generators MG1 and MG2 and the engine E are smoothly changed.

Next, a process of driving force control executed by the integration controller 6 will be described with reference to the accompanying drawings of FIGS. 6 to 10.

Figure 6:
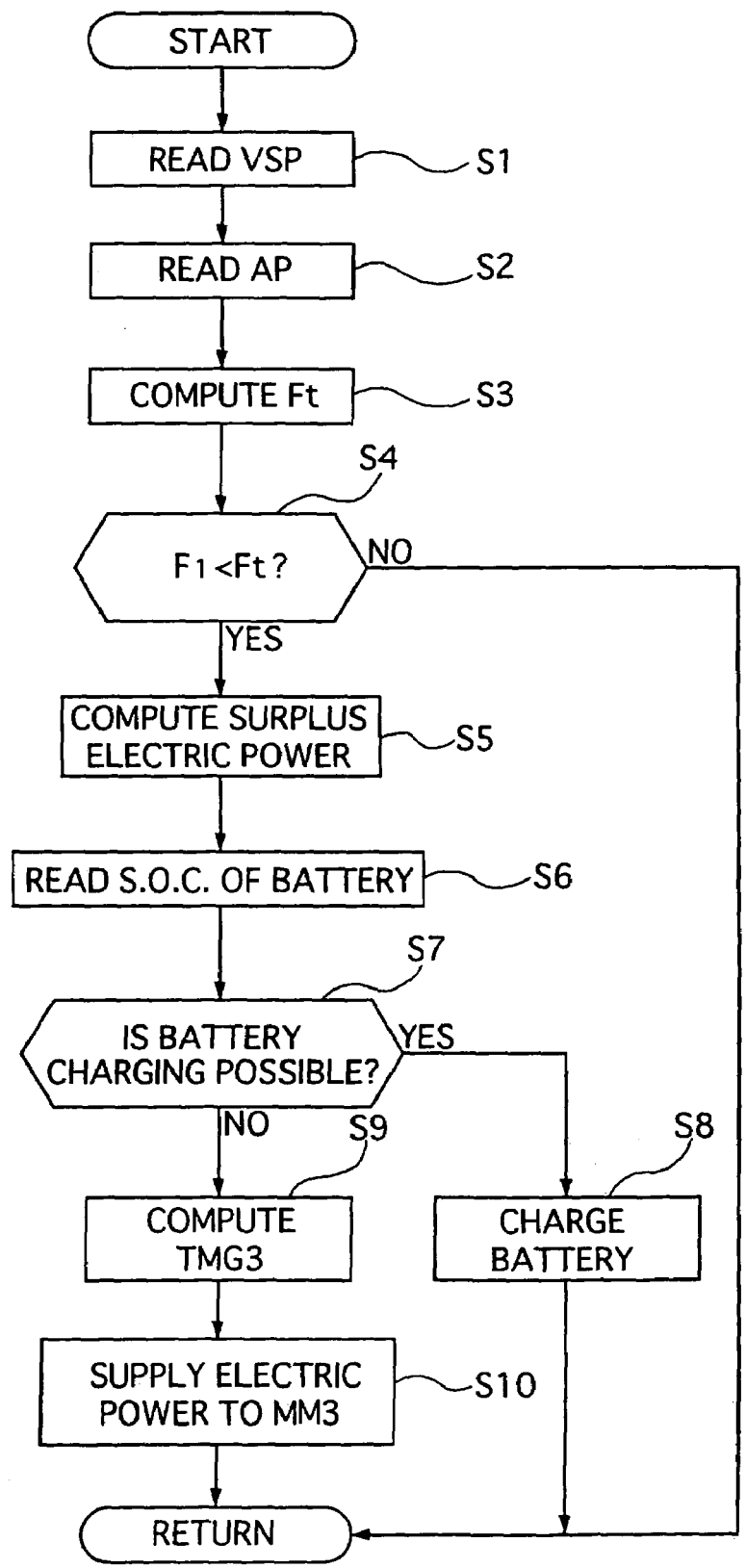
FIG. 6 is a flow chart of a driving force control process that is executed by an integration controller used in the control part shown in FIG. 1.

FIG. 6 shows a flow chart of the process of the driving force control while vehicle running.

At step S1, the integration controller 6 reads a vehicle speed VSP outputted from the vehicle speed sensor 8, and then the flow goes to step S2.

At the step S2, the controller 6 reads an accelerator opening degree AP of the accelerator pedal outputted from the accelerator sensor 7, and then the flow goes to step S3.

At the step S3, target driving force Ft is computed based on the vehicle speed VSP and the accelerator opening degree AP, and then the flow goes to step S4. The target driving force Ft is, as shown in FIGS. 7A to 7C, set so that the target driving force Ft is set to increase with the accelerator opening degree AP at the first stage of vehicle starting and then decrease with increasing the vehicle speed VSP. Namely, the target driving force Ft at starting point of time t0 is set to be larger as the detected accelerator opening degree AP is larger, and this target driving force Ft is remained unchanged for a short time or until the time the vehicle speed VSP reaches a certain speed. After then, the target driving force Ft is reduced.

At the step S4, The controller 6 judges whether or not driving force F1 at the time when the first and second motor/generators MG1 and MG2 generates surplus power is smaller than the target driving force Ft computed at the step S3. If YES, the flow goes to step S5, while, if NO, the flow goes to RETURN.

At the step S5, the amount of the surplus power generated by the first and second motor/generators MG1 and MG2 is computed, and then the flow goes to step S6. The surplus power caused by the power balance between the motor/generators MG1 and MG2 can be obtained only when an electricity amount generated by the first motor/generator MG1 and/or the second motor/generator MG2 exceeds an electricity amount consumed by the first motor/generator MG1 or the second motor/generator MG2: This surplus power is caused in the following three cases shown in FIGS. 8 to 10, where T1, Te, T2, and T0 denote torque generated by the first motor/generator MG1, torque outputted from the engine E, torque outputted from the second motor/generator MG2, and output torque of the transmission TM, respectively. In these cases, the drive train 100 is operated in the HEV-LOW-iVT mode. The HEV-LOW-iVT mode corresponds to a large driving force running mode of the present invention.

Figure 8:
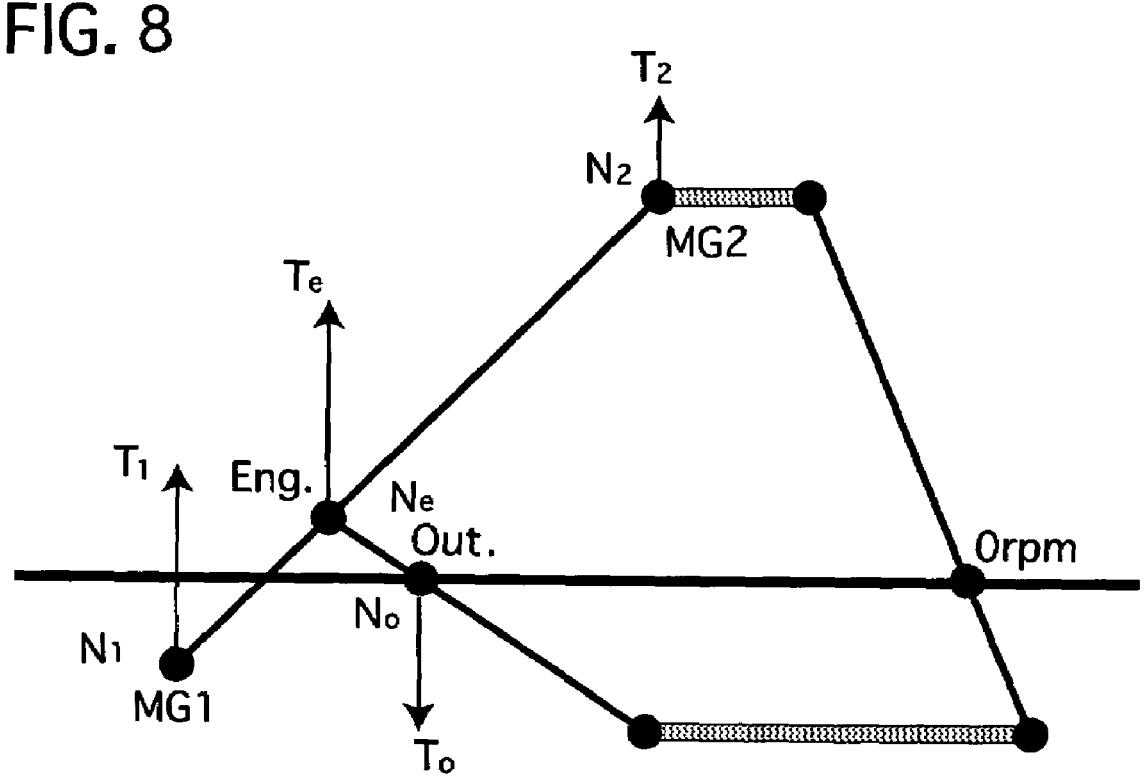
FIG. 8 is a common velocity diagram of the transmission in the HEV-LOW-iVT mode that is selected by the integration controller when a first motor/generator generates electricity with a second motor/generator consuming the electricity.

The first case is shown in a common velocity diagram of FIG. 8. In this case, the generation amount of the first motor/generator MG1 exceeds the consumption amount consumed of the second motor/generator MG2. The surplus power is computed by an equation: (the generation amount of the first motor/generator MG1)−(the consumption amount of the second motor/generator MG2)

Figure 9:
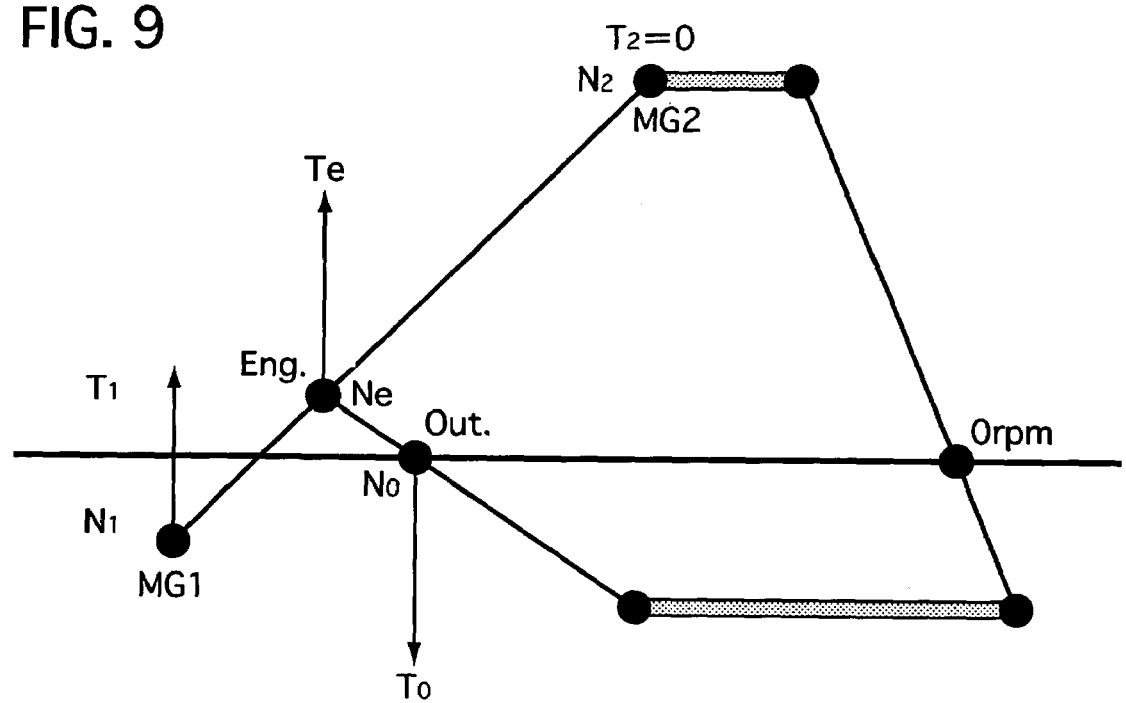
FIG. 9 is a common velocity diagram of the transmission in the HEV-LOW-iVT mode that is selected by the integration controller when the first motor/generator generates electricity with output of the second motor/generator outputs being zero.

The second case is shown in a common velocity diagram of FIG. 9. In this case, electricity is generated by the first motor/generator MG1 and an output of the second motor/generator MG2 is zero. The surplus power is computed by an equation: (the generation amount of the first motor/generator MG1)—zero.

Figure 10:
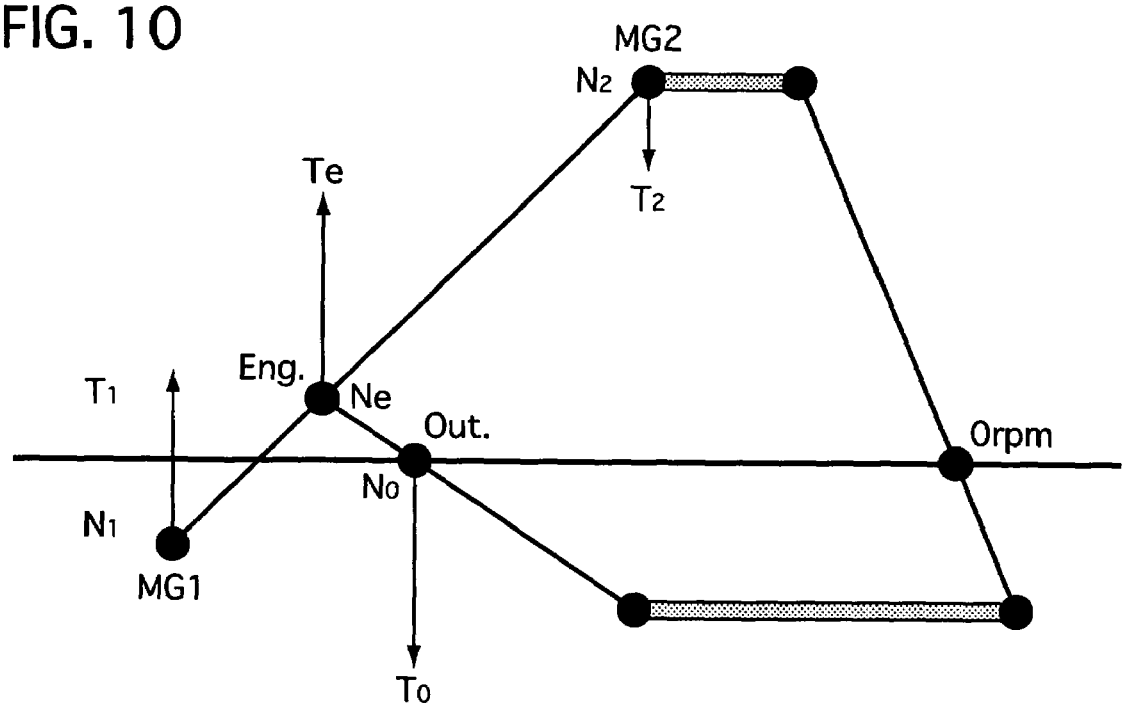
FIG. 10 is a common velocity diagram of the transmission in the HEV-LOW-iVT mode that is selected by the integration controller when both of the first and second motor/generators generate electricity.

The third case is shown in a common velocity diagram of FIG. 10. In this case, electricity is generated by the first and second motor/generators MG1 and MG2. The surplus power is computed by an equation: (the generation amount of the first motor/generator MG1)+(the generation amount of the second motor/generator MG2)

At the step S6, the integration controller 6 reads the S.O.C. of the battery 4 from the battery monitor 12 through the motor controller 2, and then the flow goes to step S7.

At the step S7, the controller 6 judges whether or not battery is in a chargable state. If, YES, the flow goes to step S8, while, if NO, the flow goes to step S9.

At the step S8, the battery 4 is charged, and then the flow goes to RETURN.

At the step S9, target motor torque TMG3 of the third motor MM3 is computed, and then the flow goes to step S10. The target motor torque TMG3 is calculated by subtracting the driving force F1 obtained at the time of generation of the surplus power from the target driving force Ft obtained at the step S3.

At the step S10, the third motor MM3 is supplied with the surplus power through the inverter 3 controlled by the motor controller 2 and the integration controller 6 to drive the right and left rear wheels, and then the flow goes to RETURN.

Next, the driving force control in vehicle starting will be described in detail.

In a rapid starting when the HEV-Low-iVT mode is selected with the acceleration opening degree AP being equal to or more than 3/8, a driving force F1 obtained when the first motor/generator MG1 generates surplus power being smaller than the target driving force Ft, and the battery 4 being not in a chargeable state, at least one of the engine E, the first and second motor/generators MG1 and MG2 drives the front wheels 14 through the transmission TM, and the third motor MG3, supplied with the surplus power, drives the rear wheels 16. This process is executed according to the steps S1 to S7 and the steps S9 to S10 in FIG. 6.

In the rapid starting when the HEV-Low-iVT mode is selected with the acceleration opening degree AP being equal to or more than 3/8, the driving force F1 outputted through the transmission TM when the first motor/generator MG1 generates the surplus power being smaller than the target driving force Ft, and the battery 4 being in the chargable state, the electric power generated by the first motor/generator MG1 is charged to the battery 4 and the third motor MG3 does not drive the rear wheels 16. This process is executed according to the steps S1 to S8 in FIG. 6.

In a slow starting when the HEV-Low-iVT mode is selected with the acceleration opening degree AP being equal to or less than 1/8 and a driving force F1 obtained when the first motor/generator MG1 generates the surplus power being equal to or more than the target driving force Ft, the engine E and the first and second motor/generators MG1 and MG2 drive the front wheels 14 through the transmission TM so as to accelerate the vehicle slowly, while the third motor MM3 does not drive the rear wheels 16. This process is executed according to the steps S1 to S4 in FIG. 6.

FIG. 8 shows a common velocity diagram in the HEV-Low-iVT mode in starting, where Te is engine torque, T1 is torque of the first motor/generator MG1, T2 is torque of the second motor/generator MG2, To is torque of the output shaft SFT2, Ne is an engine speed, N1 is a rotational speed of the first motor/generator MG1, N2 is a rotational speed of the second motor/generator MG2, and No is an output speed of the output shaft SFT2.

In the common velocity diagram in the HEV-Low-iVT mode when the vehicle starts, balance between input power and output power is expressed by the following equation:

$$Te \cdot Ne + T1 \cdot N1 + T2 \cdot N2 + To \cdot No = 0 \qquad (1)$$

In this equation (1), a vehicle speed is 0 Km/h at starting, thereby No=0, so that the next equation is obtained:

$$Te \cdot Ne = -T1 \cdot N1 - T2 \cdot N2 \qquad (2)$$

This equation (2) shows that an output power outputted from the engine E needs to be absorbed by the first and second motor/generators MG1 and MG2 when the vehicle starts at the variable ratio in the low transmission ratio area, in the HEV-Low mode. In this state, the generation amount of the first motor/generator MG1 is larger than the consumption amount of the second motor/generator MG2. Therefore, the surplus power caused by the power balance between the first and second motor/generators MG1 and MG2 can be charged to the battery 4 when the battery 4 is in the chargable state, while the surplus power is supplied to the third motor MM3 to increase driving force when the battery 4 is in a full-charged state and the driving force outputted through the transmission TM is smaller than the target driving force Ft determined based on the accelerator opening degree AP and the vehicle speed VSP.

For example, in the rapid starting when the surplus power is generated from the power balance between the first and second motor/generators MG1 and MG2 and the engine E is operated at full-opening degree (AP=8/8), as shown in FIG. 7A, the driving force F1 outputted through the transmission TM for driving the front wheels 14 is added with the driving force, indicated by a dashed line in FIG. 7A, outputted from the third motor MM3 for driving the rear wheels 16 so as to obtain the target driving force Ft. This target force Ft accelerates the vehicle rapidly, improving its starting performance. F0 indicates driving force obtained from the transmission TM when the surplus power is zero.

In a starting when the surplus power is generated from the power balance between the first and second motor/generators MG1 and MG2 and the engine E is operated at partly opening degree (AP=3/8), as shown in FIG. 7B, the driving force F1 outputted through the transmission TM for driving the front wheels 14 is added with the driving force, indicated by a dashed line in FIG. 7B, outputted from the third motor MM3 for driving the rear wheels 16 so as to obtain the target driving force Ft. This driving force outputted from the third motor MG3 becomes smaller than that outputted in the rapid starting, but improves its starting performance.

In the slow starting when the engine E is operated at small opening degree (AP=1/8), as shown in FIG. 7B, the driving force F1 outputted through the transmission TM for driving the front wheels 14 corresponds with the target driving force Ft. This results in stopping the third motor MM3 and propelling the vehicle only by the front wheels 14.

As described above, the drive train 100 of the embodiment has advantages in that the surplus power caused by the power balance between the first and second motor/generators MG1 and MG2 can be supplied to the third motor MM3 to drive the wheels so as to use the surplus power to increase fuel efficiency and remove measures for cooling the first motor/generator MG1.

The integration controller 6 can supply the surplus power to the third motor MM3 based on a judgment on the possibility of obtaining the surplus power caused by the power balance between the first and second motor/generators MG1 and MG2.

The integration controller 6 can supply the surplus power to the third motor MM3 based on a judgment on the fact that one of the first and second motor/generators MG1 and MG2 generates electricity and the output of the other is zero.

The integration controller 6 can supply the surplus power to the third motor MM3 based on a judgment on the fact that both of the first and second motor/generators MG1 and MG2 generate electricity.

The drive train 100 can drive the four front and rear wheels 14 and 16 by propulsion powers outputted through the transmission TM and the third motor MM3 that is supplied with the surplus power caused by the power balance of the first and second motor/generators MG1 and MG2, thereby obtaining high acceleration and traction performance. It is desirable for the front wheels 14 to be driven by the driving force F1 outputted through the transmission TM in order to obtain excellent traction performance at normal running, because the front portion of the vehicle with this drive train 100 is heavy. In addition, it is desirable for the rear wheels 16 to be driven by the driving force outputted from the third motor MM3 that is supplied with the surplus power when the vehicle accelerates, because a vehicle body is declined rearward by acceleration, increasing load acting on the rear wheels 16 to increase their traction.

The integration controller 6 computes the target driving force Ft based on the accelerator opening degree AP and the vehicle speed VSP in vehicle starting and judges whether or not the driving force outputted through the transmission TM is smaller than the target driving force Ft. When its judgment is YES and the surplus power is generated, the surplus power is supplied to the third motor MM3 to propel the vehicle, increasing the driving force in a rapid starting at the large accelerator opening degree.

The integration controller 6 receives information on S.O.C. of the battery 4 from the battery monitor 12 and determines whether or not the battery 4 is in a chargable state. Then it controls the surplus power to be supplied to the battery 4 when the battery 4 is in the chargable state, while it controls the surplus power for obtaining necessary torque to be supplied to the third motor MM3 when the battery 4 in not in the chargable state.

The transmission TM is equipped with planetary gear sets having axes corresponding to the first motor/generator MG1, the engine E, the output shaft SFT2 connected with the third pinion carrier PC3, the second motor/generator MG2 which are arranged in these order in the common velocity diagram of the transmission TM, and controlled by the low brake LB to obtain the variable ratio in low transmission ratio range. In this mode, the transmission TM can provide the vehicle with high acceleration performance by using the surplus power caused by the power balance between the first and second motor/generators MG1 and MG2 in vehicle starting in the High-Low-iVT mode.

While there have been particularly shown and described with reference to preferred embodiments thereof, it will be understood that various modifications may be made therein, and it is intended to cover in the appended claims all such modifications as fall within the true spirit and scope of the invention.

For example, the third motor MM3 may drive the front wheels 14 so as to assist the first and second motor/generators MG1 and MG2, and the engine E and the first and second motor/generators MG1 and MG2 may drive the rear wheels 16 through the transmission TM.

The first motor/generator MG1 and/or the second motor/generator MG2 may supply the surplus power to the third motor MM3 to drive when the vehicle starts rearward or accelerates at middle or high speed.

The first motor/generator MG1 and/or the second motor/generator MG2 may supply the surplus power to the third motor MM3 to drive despite the S.O.C. of the battery 4, full-charged or not.

The entire contents of Japanese Patent Application No. 2003-355010 filed Oct. 15, 2003 is incorporated herein by reference.

What is claimed is:

1. A drive train for a hybrid electric vehicle comprising:
    an engine that provides propulsion power by burning fuel;
    a first motor/generator that is selectively switched between an electric motor for providing driving force and an electric generator for producing electric power;
    a second motor/generator that is selectively switched between an electric motor for providing driving force and an electric generator for producing electric power;
    a third motor capable of providing driving force;
    a transmission equipped with planetary gear sets having rotatable elements that are in connecting relationships with an output shaft connected to wheels, said engine, and said first and second motor/generators, said transmission being capable of transferring at least output of said engine to the wheels through the output shaft in a large driving force running mode obtained under a condition where said engine is in operation and at least one of said first and second motor/generators acts as the electric generator; and
    a controller that controls said first and second motor/generators and said third motor so that surplus power caused by power balance between said first and second motor/generators in the large driving force running mode is supplied to said third motor when the surplus power is generated.

2. The drive train for the hybrid electric vehicle of claim 1, wherein said controller detects existence of the surplus power when an electricity amount generated by one of said first and second motor/generators exceeds an electricity amount consumed by the other of said first and second motor/generators.

3. The drive train for the hybrid electric vehicle of claim 1, wherein said controller detects existence of the surplus power when one of said first and second motor/generators generates electricity and the other of said first and second motor/generators outputs zero.

4. The drive train for the hybrid electric vehicle of claim 1, wherein said controller detects existence of the surplus power when both of said first and second motor/generators generates electricity.

5. The drive train for the hybrid electric vehicle of claim 1, wherein the wheels includes a first set of wheels and a second set of wheels, the first set of wheels being driven by a driving force outputted through said transmission, and the second set of wheels being driven by a driving force outputted from said third motor.

6. The drive train for the hybrid electric vehicle of claim 5, wherein the first set of wheels is a set of front wheels and the second set of wheels is a set of rear wheels.

7. The drive train for the hybrid electric vehicle of claim 1, wherein said controller receives information on an accelerator opening degree of an accelerator pedal and a vehicle speed so as to compute a target driving force and supplies the surplus power to said third motor when the driving force outputted through said transmission is smaller than the target driving force and the surplus power is generated.

8. The drive train for the hybrid electric vehicle of claim 7, which further comprises a battery and a battery monitor that detects a state of charge of said battery, and wherein said controller supplies the surplus power to said battery when battery-charging is possible, while said controller supplies the surplus power to said third motor when the battery-charging is impossible.

9. The drive train for the hybrid electric vehicle of claim 1, which further comprises a battery and a battery monitor that detects a state of charge of said battery, and wherein said controller supplies the surplus power to said battery when battery-charging is possible, while said controller supplies the surplus power to said third motor when the battery-charging is impossible.

10. The drive train for the hybrid electric vehicle of claim 1, wherein the planetary gear sets of said transmission have velocity axes corresponding to said first motor/generator, said engine, the output shaft, and said second motor/generator that are arranged in these order in a common velocity diagram of said transmission, and wherein said transmission is controlled by a low brake to obtain the transmission ratio in a low transmission ratio range having a hybrid-electronic-vehicle-variable-transmission-ratio (HEV-iVT) mode where said engine and said first and second motor/generators are in operation so as to obtain a variable transmission ratio in the low transmission ratio range, and said controller controlling the surplus power to be supplied to said third motor in vehicle starting in the HEV-iVT mode.

11. The drive train for the hybrid electric vehicle of claim 10, wherein said controller receives information on an accelerator opening degree of an accelerator pedal and vehicle speed to compute a target driving force and supplies the surplus power to said third motor when the driving force outputted through said transmission is smaller than the target driving force and the surplus power is generated.

12. The drive train for the hybrid electric vehicle of claim 11, which further comprises a battery and a battery monitor that detects a state of charge of said battery, and wherein said controller supplies the surplus power to said battery when battery-charging is possible, while said controller supplies the surplus power to said third motor when the battery-charging is impossible.

13. The drive train for the hybrid electric vehicle of claim 10, which further comprises a battery and a battery monitor that detects a state of charge of said battery, and wherein said controller supplies the surplus power to said battery when battery-charging is possible, while said controller supplies the surplus power to said third motor when the battery-charging is impossible.

14. A transmission for a hybrid electronic vehicle comprising:

planetary gear sets with rotatable elements that are in connecting relationships with an output shaft, an engine, a first motor/generator and a second motor/generator, wherein said planetary gear sets can be shifted among a plurality of running modes including a large driving force running mode, and have velocity axes corresponding to said first motor/generator, said engine, the output shaft, and said second motor/generator that are arranged in these order in a common velocity diagram of said transmission, said planetary gear sets being controlled by a low brake to obtain a transmission ratio in a low transmission ratio range including a hybrid-electronic-vehicle-variable-transmission-ratio (HEV-iVT) mode where said engine and said first and second motor/generators are in operation so as to obtain the variable transmission ratio and said planetary gear sets transfer at least an output of said engine to wheels through the output shaft with generating surplus power caused by a power balance between said first and second motor/generators for driving a third motor in the vehicle starting in the HEV-iVT mode.

15. A method of driving a hybrid electric vehicle comprising:

providing propulsion power by an engine;

respectively switching a first motor/generator and a second motor/generator selectively between an electric motor for providing driving force and an electric generator for producing electric power; and supplying surplus power caused by a power balance between said first and second motor/generators to a third motor for outputting driving force when the surplus power is generated and a large driving force running mode of a transmission is obtained under a condition where said engine is in operation and at least one of said first and second motor/generators acts as an electric generator, said transmission being is equipped with planetary gear sets with rotatable elements that are in connecting relationships with an output shaft connected to wheels, said engine and said first and second motor/generators to be shiftable among a plurality of running modes including the large driving force running mode where said transmission is capable of transferring at least an output of said engine to the wheels through the output shaft.

* * * * *